Patented Jan. 13, 1953

2,625,543

UNITED STATES PATENT OFFICE 2,625,543

PENICILLIN HISTIDINE

Simon L. Ruskin, New York, N. Y.

No Drawing. Original application May 25, 1945, Serial No. 595,885. Divided and this application March 27, 1952, Serial No. 278,968

1 Claim. (Cl. 260—239.1)

My invention relates to the manufacture of improved therapeutic compositions containing or consisting of penicillin or its metal salts and more particularly to antibiotic therapeutic preparations containing these substances and stabilized by an amino or imino compound.

It is known that penicillin is a highly unstable material and rapidly loses potency both in the solid form and in solution, especially in the latter form. Thus, aqueous solutions of penicillin and its salts are so highly unstable at room temperature that their employment has been virtually restricted to use in hospitals and in physicians' offices because of the care with which they must be stored and prepared for use. In view of the fact that the dosage of penicillin requires renewal at every three to six hours, the employment of penicillin for home use has been practically excluded. Various attempts to stabilize penicillin by converting it into a metal salt to enable it to be marketed in the solid form, have not been entirely successful. Thus, the sodium salt is highly hygroscopic and rapidly loses strength on the accretion of moisture; and even in the solid condition it must be stored in the icebox to prevent too rapid loss in potency.

It is the general object of the invention to provide stable derivatives and preparations of penicillin whereby solutions, ointments and tablets may be prepared therewith which will maintain their potency over relatively long periods of time even though exposed to air and room temperature.

It is a further object of the invention to provide therapeutic compositions prepared from penicillin, which are excreted more slowly than the penicillin itself, so that a longer-lasting action is obtained and the frequency of treatment is reduced.

It is also an object of the invention to provide therapeutic compositions derived from penicillin in which the anti-biotic action of these drugs is not only preserved, but in many instances even increased.

I have found that amine compounds generally have a decided stabilizing action on penicillin and its metal salts. While this is true of amines broadly, those coming within the scope of the present invention are the amines which are non-toxic, or substantially so, in the dosages in which they are to be used. In general, amines capable of forming addition products or salts with an organic acid, are suitable for the purposes of the present invention. The amino groups may form part of either cyclic or non-cyclic, that is, open chain compounds. Among the amino compounds contemplated by the present invention are those having amino groups attached to purely hydrocarbon radicals.

I have found further that it is not necessary to convert all of the penicillin or its salts or esters into the corresponding addition compounds with the amine. Only a relatively small proportion of the anti-bacterial compound need be so converted and the part so converted acts as stabilizer for the remaining unconverted portion. While, therefore, I believe that an actual addition product or salt is practically in all cases formed when the amine compound is added to penicillin or its salt or ester, it will be understood that I am not committed to any particular chemical theory, and that the amine may equally well be regarded as a stabilizing agent whose chemical action may not be fully understood.

The following example will serve to illustrate the invention but is not to be understood as indicating the limits thereof:

*Example.—Penicillin histidine*

10 g. of penicillin acid are dissolved in 200 cc. of distilled water. To this solution are now added 10 g. of histidine base. A clear yellow solution results. This is now vacuum desiccated and lyophilized. A yellow crystalline mass forms in the container. The yield is 20 grams. The product is then standardized by Oxford units.

Penicillin histidine is particularly effective for oral use as it is resistant to destruction by gastric juices. It is considerably more stable on storage than penicillin itself.

This application is a division of my prior application Serial No. 595,885 filed May 25, 1945, now abandoned.

I claim:

Penicillin histidine.

SIMON L. RUSKIN.

No references cited.